(12) United States Patent
Cox (10) Patent No.: US 7,854,474 B2
(45) Date of Patent: Dec. 21, 2010

(54) REINFORCING BRACE

(75) Inventor: Jared S. Cox, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/285,971

(22) Filed: Oct. 17, 2008

(65) Prior Publication Data

US 2010/0096888 A1    Apr. 22, 2010

(51) Int. Cl.
*B62D 21/00* (2006.01)

(52) U.S. Cl. .............. 296/204; 296/29; 296/30; 280/781; 180/312

(58) Field of Classification Search ............ 296/193.07, 296/203.01, 204, 203.02, 203.04, 29, 30; 280/781, 800, 124.109; 180/312
See application file for complete search history.

(56) References Cited

U.S. PATENT DOCUMENTS

| | | | |
|---|---|---|---|
| 1,491,563 A | 4/1924 | Stresau | |
| 2,846,235 A | 8/1958 | Curell | |
| 5,193,868 A | 3/1993 | O'Toole | |
| 6,237,304 B1 | 5/2001 | Wycech | |
| 6,296,418 B1 | 10/2001 | Birkwald et al. | |
| 6,641,168 B2 * | 11/2003 | Heise et al. | 280/781 |
| 6,877,754 B2 | 4/2005 | Kim | |
| 7,198,691 B2 | 4/2007 | Ludin et al. | |
| 7,393,015 B1 | 7/2008 | Gillespie et al. | |
| 7,726,718 B2 * | 6/2010 | Weirup | 296/30 |

FOREIGN PATENT DOCUMENTS

| | | |
|---|---|---|
| JP | 4005177 | 1/1992 |
| JP | 6336180 | 12/1994 |

* cited by examiner

*Primary Examiner*—Joseph D Pape
(74) *Attorney, Agent, or Firm*—Plumsea Law Group, LLC (57) ABSTRACT

A reinforcing brace is disclosed. The reinforcing brace supports a collar of a fastener. In addition, the reinforcing brace is configured to strengthen the connection between a frame rail and a cross member. By aligning side walls of the reinforcing brace with walls of the cross member, the reinforcing brace can continue the walls of the cross member through the frame rail to strengthen the connection between the frame rail and the cross member.

15 Claims, 10 Drawing Sheets

REINFORCING BRACE

BACKGROUND OF THE INVENTION

1. Field of the Invention

The present invention relates to motor vehicles and in particular to a reinforcement system for a body frame rail.

2. Description of Related Art

Reinforcing systems have been previously proposed. A rear suspension connecting structure can be used under a floor of a motor vehicle. Vertical reinforcements and vertical bulkheads have been used in attempts to reinforce a structure including a cross member and a side member. Gillespie et al. (U.S. Pat. No. 7,393,015) teaches a vehicle sub-frame attachment apparatus and method. Gillespie teaches a mounting pin that is welded at the bottom to a sub-frame mounting bracket. Gillespie also teaches a shear planar bulk head that includes a channel for receiving the pin. The pin is welded to the shear planar bulk head. In addition, the shear planar bulk head is welded to the frame at two locations.

SUMMARY OF THE INVENTION

A reinforcing brace is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a reinforcement system for a body frame rail, comprising: a frame rail; a collar in contact with the frame rail and extending in a substantially perpendicular direction to the frame rail; a cross member configured to attach to the frame rail in a substantially perpendicular manner; the cross member including a first wall and a second wall configured to attach to the frame rail; a reinforcing brace configured to attach to the collar, the reinforcing brace including a first side wall that extends laterally across the frame rail and the reinforcing brace including a second side wall that extends laterally across the frame rail; and wherein the first side wall of the reinforcing brace is aligned in a manner that substantially continues the first wall of the cross member and where the second side wall of the reinforcing brace is aligned in a manner that substantially continues the second wall of the cross member.

In another aspect, the invention provides a reinforcement system for a body frame rail, comprising: a frame rail including a first wall and a second wall, the length of the frame rail extending in a longitudinal direction and the width of the frame rail extending in a lateral direction; a collar in contact with the frame rail and extending in a substantially perpendicular direction to the frame rail, the collar configured to attach to a suspension system; a reinforcing brace configured to attach to the collar, the reinforcing brace including a first side wall and a second side wall; and wherein the first side wall and the second side wall of the reinforcing brace extend approximately in the lateral direction between the first wall and the second wall of the frame rail.

In another aspect, the invention provides a reinforcement system for attaching a sub-frame to a body frame rail, the system comprising: a collar configured for receiving a fastener for attaching the collar to the frame rail; a reinforcing brace for attaching to the collar and the frame rail; wherein the reinforcing brace comprises a first side portion and a second side portion, the first side portion comprises a second wall and a third wall that join at a third corner disposed adjacent to the collar, the second side portion comprises a fourth wall and a fifth wall that join at a sixth corner disposed adjacent to the collar, wherein the second wall, the third wall, the fourth wall and the fifth wall each comprise a planar surface and a rib projecting from the planar surface.

In another aspect, the invention provides a reinforcement system for attaching a sub-frame to a body frame rail, the system comprising: a collar configured for receiving a fastener for attaching the collar to the frame rail; a reinforcing brace for attaching to the collar and the frame rail; a cross member configured to attach to a portion of the frame rail; the cross member having a first cross member wall configured to attach to a first portion of the frame rail and the cross member having a second cross member wall configured to attach to a second portion of the frame rail; and wherein the reinforcing brace includes a first wall configured to attach to the first portion and wherein the reinforcing brace includes a second wall configured to attach to the second portion.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
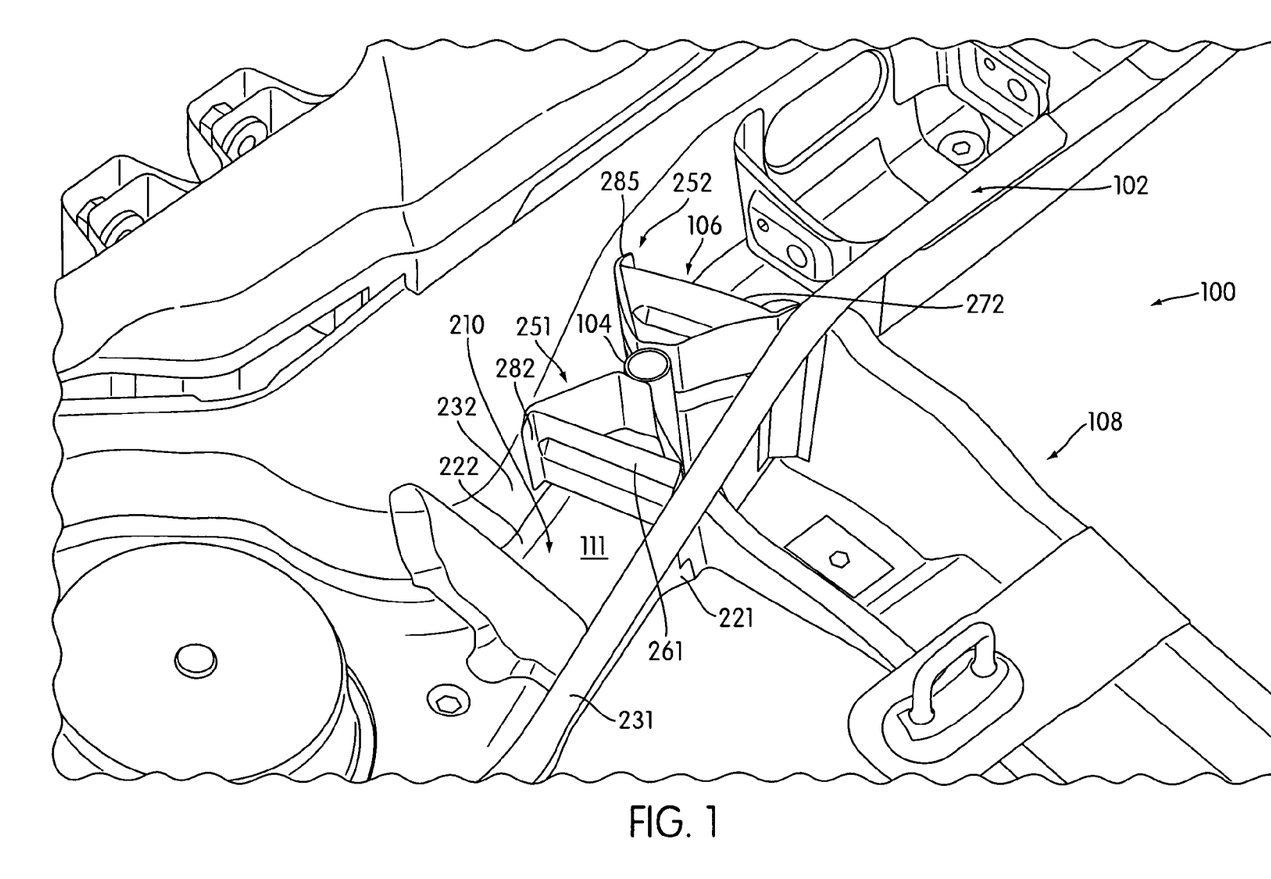
FIG. 1 is an assembled isometric view of an embodiment of a portion of a reinforcement system.
Figure 2:
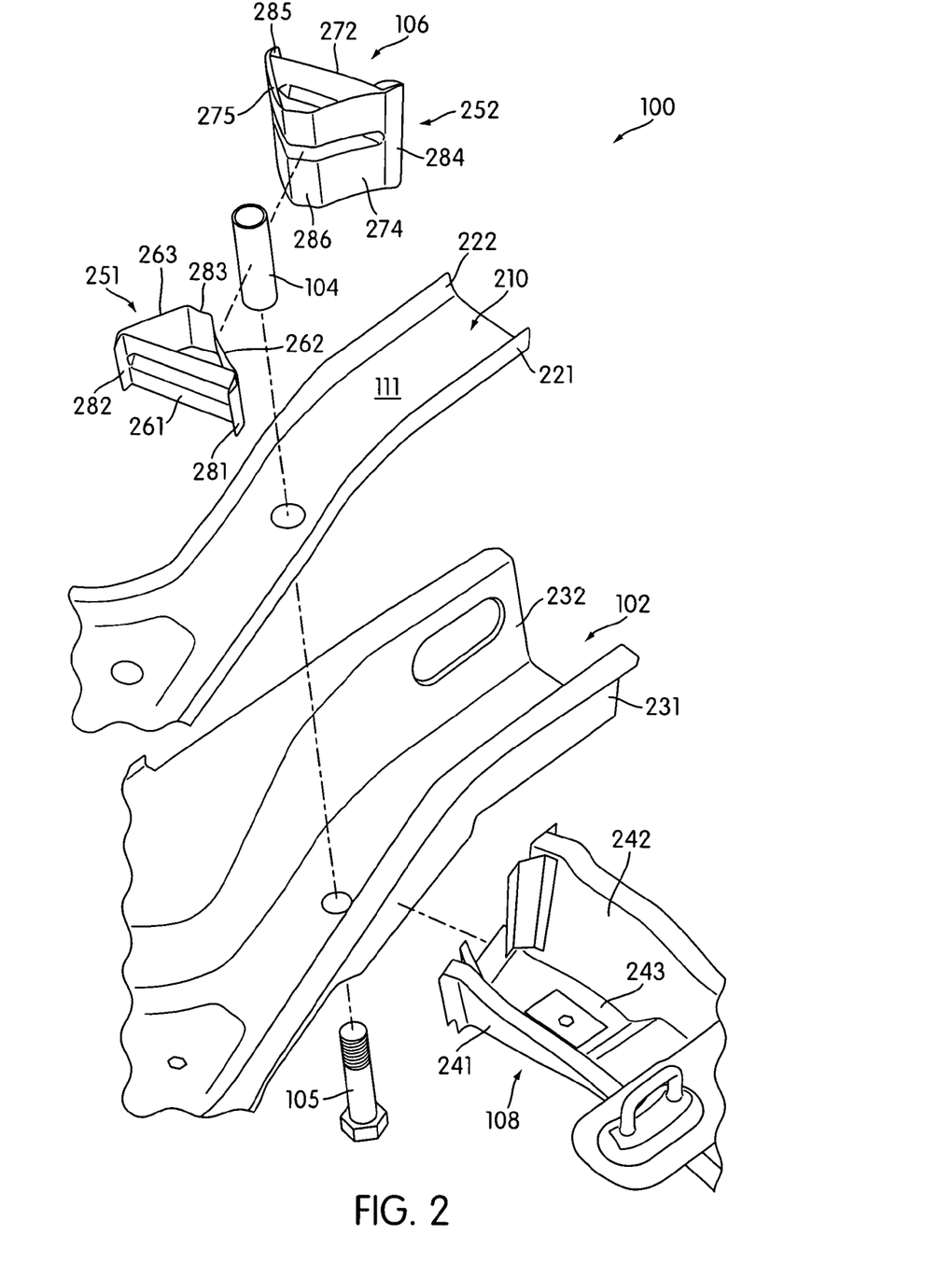
FIG. 2 is an exploded isometric view of an embodiment of a portion of a reinforcement system including a frame rail, cross member and a reinforcing brace.

FIG. 1 and FIG. 2 are isometric views of a portion of reinforcement system 100. In particular, FIG. 1 is an assembled isometric view of a portion of reinforcement system 100 and FIG. 2 is an exploded isometric view of a portion of reinforcement system 100 for a motor vehicle. Generally, reinforcement system 100 could be associated with any type of motor vehicle including, but not limited to, cars, trucks, vans, minivans, SUVs, motorcycles, scooters, boats, personal watercraft, and aircraft. Furthermore, reinforcement system 100 could be disposed in any portion of a motor vehicle. In some embodiments, reinforcement system 100 may be associated with a full chassis. In other embodiments, reinforcement system 100 may be associated with a front body side system of a motor vehicle. In the current embodiment, reinforcement system 100 is a reinforcement system for a rear body-side of a motor vehicle. In particular, reinforcement system 100 may used for attaching a body frame rail to a sub-frame that supports an engine, driveline or suspension system.

Referring to FIGS. 1 and 2, reinforcement system 100 includes frame rail 102. Typically, frame rail 102 may be configured to provide support to another portion of a motor vehicle, including, but not limited to, an engine, a drive train or a suspension system. In one embodiment, frame rail 102 may provide support to a suspension system.

In some embodiments, frame rail 102 may comprise multiple portions. For example, in one embodiment, frame rail 102 further comprises inner frame portion 210, as illustrated in FIG. 2. In some cases, inner frame portion 210 can be a substantially flat portion that is configured to reinforce a bottom portion of frame rail 102. Also, in some cases, inner frame portion 210 can include first ridge 221 and second ridge 222 that are configured to reinforce inner frame portion 210. In other cases, frame rail 102 may not include inner frame portion 210.

In order to provide support to a suspension system, frame rail 102 may be fastened to the suspension system by a fastener such as bolt 105, as illustrated in FIG. 2. In some embodiments, frame rail 102 can be configured with a collar that receives bolt 105. In one embodiment, collar 104 is configured to receive bolt 105. In particular, collar 104 may be disposed on first side 111 of inner frame portion 210 to assist in fastening a suspension system to frame rail 102.

In embodiments where a frame rail provides support to a suspension system of a motor vehicle, a reinforcement system can include provisions to isolate vibration and harshness associated with the suspension system. For example, a reinforcement system can include a brace that surrounds a collar of the reinforcement system. With this arrangement, the brace surrounding the collar can dampen vibrations at the collar in order to provide for a more rigid connection between the collar and the frame rail.

In one embodiment, frame rail 102 includes reinforcing brace 106. Reinforcing brace 106 may support collar 104 in order to dampen vibrations that may be applied to collar 104. Generally, the height of reinforcing brace 106 can vary. In some cases, reinforcing brace 106 can have a height that is substantially equal to the height of collar 104. This arrangement allows for an increased contact area between collar 104 and reinforcing brace 106. Using this configuration, the ability of reinforcing brace 106 to dampen vibrations at collar 104 may be enhanced as reinforcing brace 106 provides reinforcement over the entire height of collar 104. In other cases, however, reinforcing brace 106 could have a height that is substantially less than the height of collar 104.

Although the entirety of frame rail 102 is not visible in these Figures, frame rail 102 will typically have a length that is greater than a width of frame rail 102. In other words, frame rail 102 extends a greater distance in a longitudinal direction than a lateral direction. The terms "longitudinal direction" and "lateral direction" as used throughout this detailed description and in the claims refers to a direction associated with a length and width, respectively, of frame rail 102.

In different embodiments, the shape of frame rail 102 may vary. Frame rail 102 may be configured with any shape including, but not limited to, flat shapes and contoured shapes. In one embodiment, frame portion 102 includes first wall 231 and second wall 232. In particular, first wall 231 and second wall 232 may extend in a vertical direction. The term "vertical direction" as used throughout this detailed description and in the claims refers to a direction perpendicular to a lateral direction and longitudinal direction. In some embodiments, first wall 231 of frame rail 102 may be disposed adjacent to first ridge 221 of inner frame portion 210. Likewise, second wall 232 of frame portion 102 may be disposed adjacent to second ridge 222 of inner frame portion 210.

Typically, frame rail 102 may also be associated with other body attachments. In one embodiment, frame rail 102 may be associated with cross member 108. In some cases, cross member 108 may be disposed substantially perpendicular to frame rail 102. In some cases, cross member 108 may be disposed adjacent to first wall 231 of frame rail 102. With this arrangement, cross member 108 may extend in a substantially perpendicular direction from first wall 231 of frame rail 102. In other cases, cross member 108 may be disposed at angle less than 90 degrees to frame rail 102.

Generally, cross member 108 may be configured with any shape. In one embodiment, cross member 108 may be configured with a C-shaped channel shape. In other words, cross member 108 may comprise a pair of walls separated by a concave central portion. Referring to FIG. 2, cross member 108 comprises first wall 241 and second wall 242 separated by central portion 243. In a similar manner to first wall 231 and second wall 232 of frame rail 102, first wall 241 and second wall 242 of cross member 108 extend in a vertical direction from a periphery of central portion 243.

In some embodiments, walls of cross member 108 may have a greater height than walls of frame rail 102. In other embodiments, walls of cross member 108 may have a height substantially equal to walls of frame rail 102. In one embodiment, first wall 241 and second wall 242 of cross member 108 are configured with a substantially similar heights to first wall 231 and second wall 232 of frame rail 102.

As previously discussed, reinforcing brace 106 supports collar 104 and can help strengthen frame rail 102. Generally, reinforcing brace 106 can have any shape. In some cases, reinforcing brace 106 can have an approximately X-like shape. In other cases, reinforcing brace 106 can have an approximately rectangular shape. In still other cases, reinforcing brace 106 could have any other shape, including, but not limited to, circular, oval, regular polygonal, irregular, as well as any other type of shape. Furthermore, reinforcing brace 106 could have any arrangement of exterior wall portions and interior wall portions.

In some embodiments, in order to support collar 104, reinforcing brace 106 may be configured with an approximately butterfly-like shape, as illustrated in FIG. 1. In other words, reinforcing brace 106 comprises first side portion 251 and second side portion 252 that form an approximately butterfly-like shape. With this arrangement, collar 104 may be disposed in the center of reinforcing brace 106 and supported by first side portion 251 and second side portion 252 of reinforcing brace 106.

In some embodiments, first side portion 251 and second side portion 252 are configured with substantially triangular shapes. Referring to FIG. 2, first side portion 251 includes first side wall 261, second wall 262 and third wall 263. First side wall 261 is attached to second wall 262 at first corner 281. Also, first side wall 261 is attached to third wall 263 at second corner 282. In addition, second wall 262 and third wall 263 join at third corner 283 disposed adjacent to collar 104. In a similar manner, second side portion 252 includes second side wall 272, fourth wall 274 and fifth wall 275. Second side wall 272 joins fourth wall 274 at fourth corner 284. Likewise, second side wall 272 joins fifth wall 275 at fifth corner 285. Finally, fourth wall 274 and fifth wall 275 join at sixth corner 286 disposed adjacent to collar 104. With this configuration, first side portion 251 and second side portion 252 can be shaped to distribute loads in multiple directions between collar 104 and frame rail 102.

In one embodiment first side wall 261 and second wall 262 may overlap for a distance at the first corner 281. This may allow for a stronger connection between first side wall 261, second side wall 262 and first wall 231. Similarly, other portions of reinforcing brace 106 may have such an overlap. In other cases, there may not be overlap between any adjacent walls of reinforcing brace 106. It will also be understood that some embodiments may not include first side wall 261 and second side wall 272.

In different embodiments, the shapes of the walls comprising a reinforcing brace can vary. In some cases, the walls can have a substantially planar shape. In other cases, the walls can have a convex shape. In still other cases, the walls can have a concave shape. In this exemplary embodiment, each wall of reinforcing brace 106 may have a substantially planar shape. This substantially planar shape can provide increased strength under vertical loading.

Various materials may be used to construct a reinforcing brace including, but not limited to, steel, aluminum, titanium, aluminum alloys, magnesium, magnesium alloys, high grade plastics and other materials. In some embodiments, a reinforcing brace may be constructed of a light weight material. In some cases, a reinforcing brace may be integrally formed through molding, casting or in another manner known in the art. In other cases, a reinforcing brace may include parts connected in any manner known in the art including, but not limited to, welding and adhesives. In one embodiment, walls of a reinforcing brace may be welded together.

Figure 3:
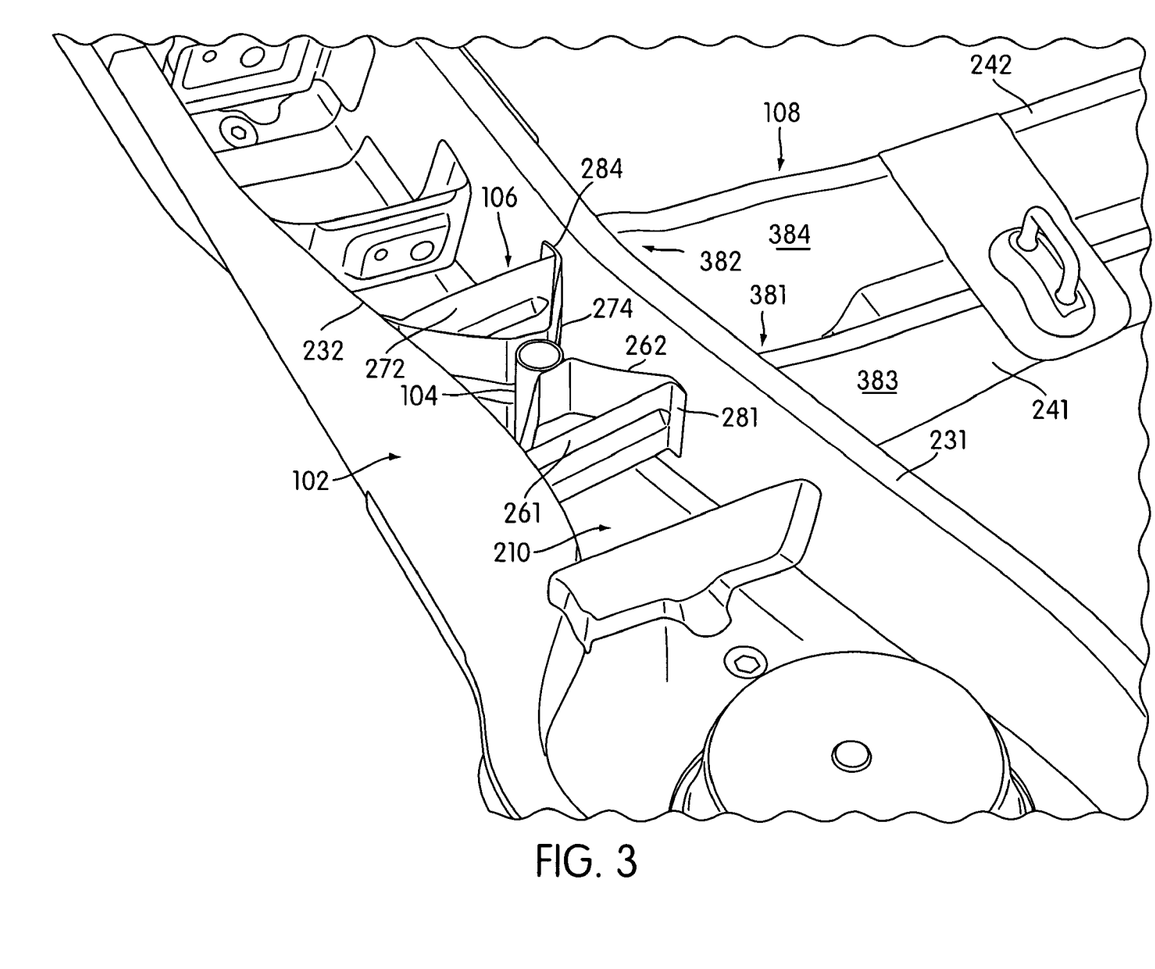
FIG. 3 is an isometric view of an embodiment of a frame rail, cross member and a reinforcing brace.

Referring to FIG. 3, reinforcing brace 106 may be disposed adjacent to frame rail 102 so that first side wall 261 and second side wall 272 of reinforcing brace 106 span frame rail 102 in a substantially lateral direction. In particular, first side wall 261 extends in a substantially lateral direction between first wall 231 and second wall 232 of frame rail 102. Similarly, second side wall 272 extends between first wall 231 and second wall 232 in a substantially lateral direction. With this arrangement, first side wall 261 and second side wall 272 may be oriented perpendicular to frame rail 102. This configuration provides additional support to frame rail 102 in a lateral direction and can help prevent crushing in the lateral direction.

Generally, first side wall 261 and second side wall 272 may be attached to first wall 231 and second wall 232 in any manner known in the art including, but not limited to, welding and adhesives. In one embodiment, first side wall 261 may be attached to first wall 231 at first corner 281. Likewise, second side wall 272 may be attached to first wall 231 at fourth corner 284. In a similar manner, first side wall 261 may be attached to second wall 232 at second corner 282 as illustrated in FIG. 1. Also, second side wall 272 may be attached to second wall 232 at fifth corner 285 (as illustrated in FIG. 1). With this arrangement, reinforcing brace 106 provides lateral support to frame rail 102.

A reinforcing brace may be configured to strengthen the connection between a frame rail and a cross member. This can be accomplished by aligning side walls of the reinforcing brace with walls of a cross member. In other words, side walls of the reinforcing brace may be nearly continuous with the walls of a cross member. Using this configuration, the reinforcing brace may be configured to distribute a lateral, longitudinal and/or vertical load from a collar of a bolt to a frame rail and walls of a cross member, which helps to strengthen the connection between a frame rail and a cross member.

Referring to FIG. 3, reinforcing brace 106 is configured to continue the walls of cross member 108 through frame rail 102. In particular, first side wall 261 of reinforcing brace 106 is generally aligned with first wall 241 of cross member 108. Likewise, second side wall 272 of reinforcing brace 106 is generally aligned with second wall 242 of cross member 108. With this arrangement, reinforcing brace 106 can strengthen the connection between frame rail 102 and cross member 108. This allows reinforcing brace 106 to distribute a lateral, longitudinal and/or vertical load from collar 104 to frame rail 102 and walls of cross member 108.

A reinforcing brace can include provisions for efficiently transferring loads from a collar to a c-channel, such as a frame rail. In some embodiments, the reinforcing brace can be attached to the most rigid portions of a c-channel. In some cases, for example, the walls of a reinforcing brace can be attached to a c-channel at portions of the c-channel that are reinforced by a secondary structure, such as a cross member. In other cases, the walls of a reinforcing brace can be attached to another rigid portion of a c-channel.

In some embodiments, frame rail 102 may be most rigid at portions associated with the attachment of cross member 108. In one embodiment, frame rail 102 may be most rigid at first portion 381 and second portion 382 due to the attachment of first cross member wall 383 and second cross member wall 384, respectively. As illustrated in FIG. 3, second wall 262 and fourth wall 274 of reinforcing brace 106 are also attached to first portion 381 and second portion 382, respectively. With this arrangement, forces received at collar 104 can be transferred via second wall 262 and fourth wall 274 to the most rigid portions of frame rail 102. This arrangement can help improve stability for collar 104.

As previously discussed, the walls of reinforcing brace 106 may have a height that is substantially similar to the height of collar 104. This arrangement allows forces applied over the full height of collar 104 to be transferred via reinforcing brace 106 to first portion 381 and second portion 382 of frame rail 102. With this arrangement, loads received at the walls of frame rail 102 are more evenly distributed over a vertical region substantially equal in height to collar 104.

Figure 4:
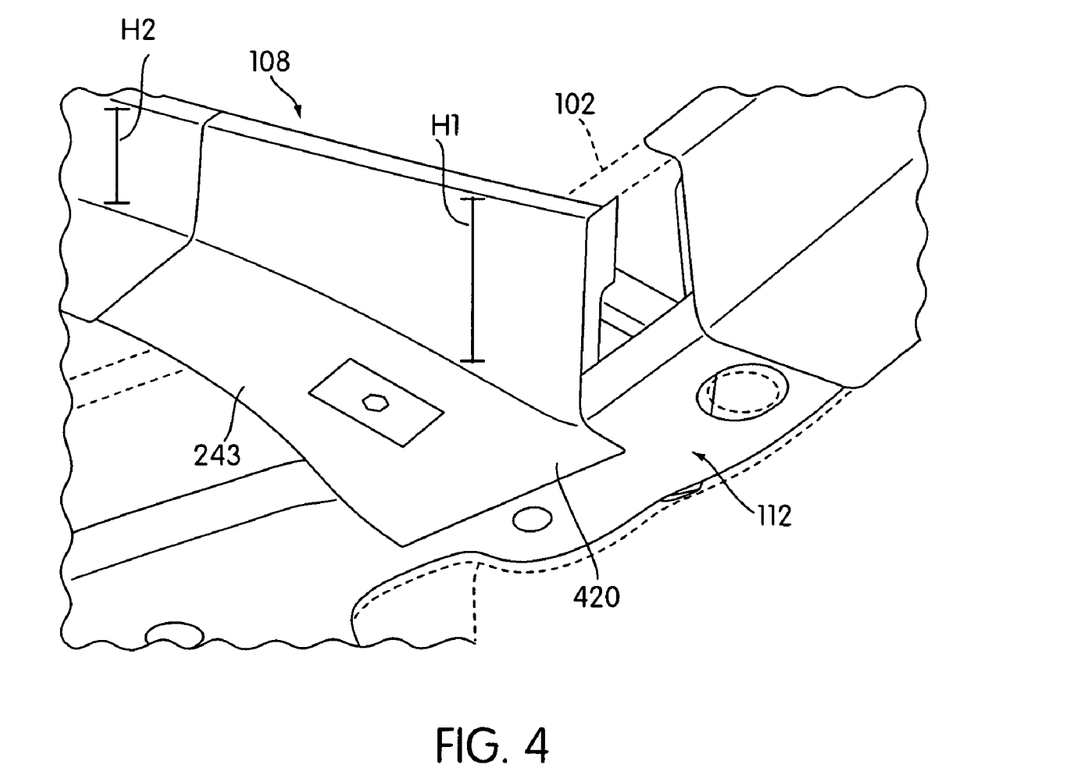
FIG. 4 is a bottom isometric view of an embodiment of a cross member connecting to a frame rail.

In some embodiments, a frame rail may also be connected to a central portion of the cross member to further strengthen the connection between the frame rail and the cross member. FIG. 4 illustrates a bottom view of an embodiment of frame rail 102 and cross member 108. In one embodiment, central portion 243 of cross member 108 may be connected to second side 112 of frame rail 102.

Central portion 243 may be configured in any shape in order to fasten to frame rail 102. In one embodiment, central portion 243 may include extended portion 420 that may be connected to frame rail 102. Extended portion 420 may be configured with any shape, including, but not limited to rectangular shapes, square shapes, round shapes, triangular shapes as well as other regular and non-regular shapes. In some cases, extended portion 420 comprises a rectangular-like shape.

In some embodiments, the height of cross member 108 may vary. For example, in one embodiments, cross member 108 may be configured with an increased height to accommodate a connection to second side 112 of frame rail 102. In particular, cross member 108 may be configured with height H1 adjacent to frame rail 102. In contrast, cross member 108 may comprise height H2 that is less than height H1 at a portion of cross member 108 disposed further from frame rail 102. With this arrangement, extended portion 420 of cross member 108 may secured to second side 112 of frame rail 102.

Generally, cross member 108 may be connected to frame rail 102 in any manner known in the art, including, but not limited to, welding, adhesives, with fasteners such as bolts, as well as other methods. In one embodiment, central portion 243 of cross member 108 may be welded to second side 112 of frame rail 102. With this arrangement, cross member 108 may be secured to frame rail 102.

In some embodiments, a reinforcing brace may include provisions to further support the connection between a frame rail and a cross member. For example, in some cases, the walls of a reinforcing brace may have a corrugated structure. In other cases, a reinforcing brace may be configured with internal supports that extend between walls of the reinforcing brace. In still other cases, a reinforcing brace may be configured with ribs to provide additional support to a frame rail and a cross member.

Figure 5:
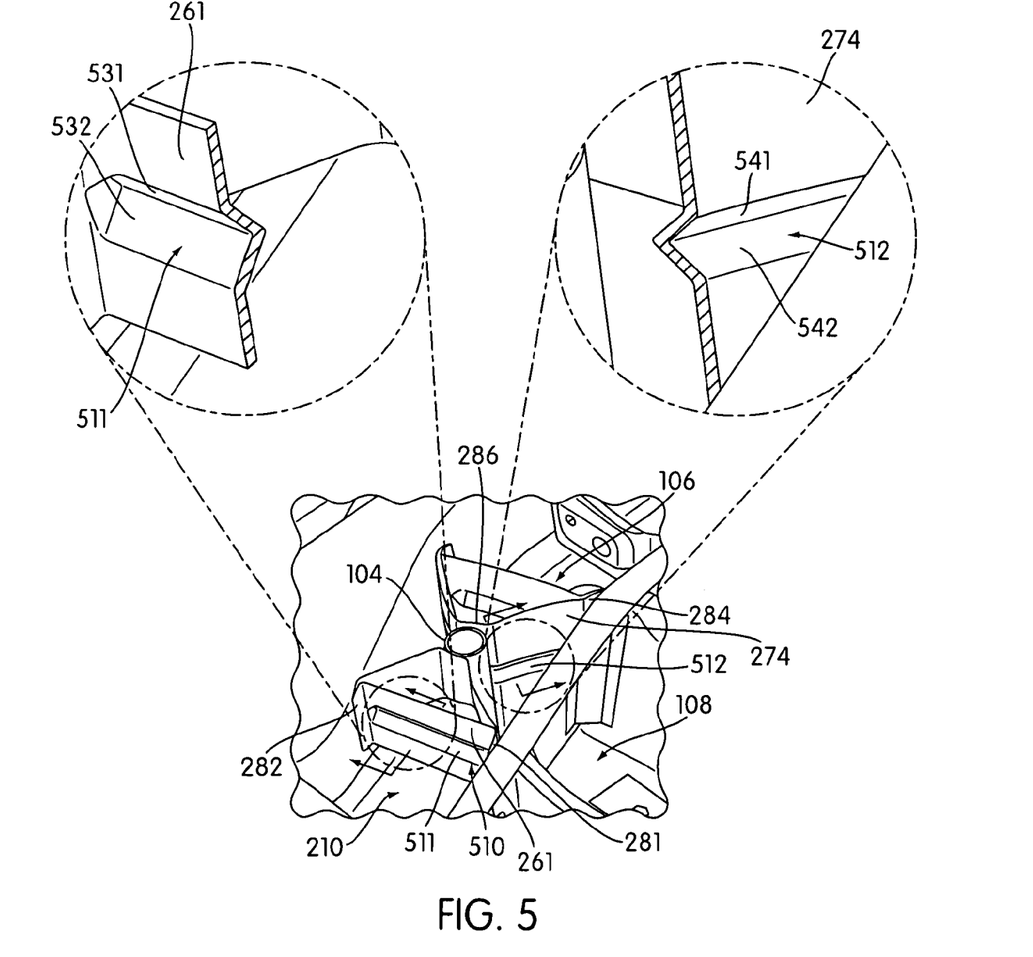
FIG. 5 is an isometric view with enlarged views of a portion of a reinforcing brace associated with a frame rail.

Referring to FIG. 5, reinforcing brace 106 is configured with plurality of ribs 510 to provide additional support to frame rail 102 and cross member 108. Plurality of ribs 510 can include any number of ribs. In some cases, plurality of ribs 510 can include six ribs. In other cases, plurality of ribs 510 can include twelve ribs. In one embodiment, plurality of ribs 510 may comprise six ribs with each rib associated with a wall of reinforcing brace 106.

Generally, plurality of ribs 510 may extend in any direction, including a lateral direction, longitudinal direction, vertical direction or any combination of directions. In one embodiment, each rib of plurality of ribs 510 extends in a substantially similar direction as an associated wall of reinforcing brace 106. For example, first rib 511, disposed on first side wall 261, extends in a lateral direction from first corner 281 to second corner 282. Likewise, second rib 512, disposed on fourth wall 274, extends in a combination of a lateral and longitudinal direction between fourth corner 284 and sixth corner 286 adjacent to collar 104. In a similar manner, the remaining ribs of plurality of ribs 510 may extend in a substantially similar direction as the associated walls of reinforcing brace 106. With this arrangement, plurality of ribs 510 provides additional strength and support to frame rail 102 and cross member 108.

Ribs of plurality of ribs 510 may be configured with any shape including, but not limited to, regular shapes, irregular shapes, convex shapes, concave shapes as well as other shapes. In some embodiments, ribs of plurality of ribs 510 are configured with substantially similar shapes. In one embodiment, plurality of ribs 510 is configured with generally concave triangular shapes.

As illustrated in the enlarged view in FIG. 5, first rib 511 comprises first portion 531 and second portion 532. First portion 531 and second portion 532 extend inward from first side wall 261. Furthermore, first portion 531 and second portion 532 join inward from first side wall 261. This arrangement allows first rib 511 to form a generally triangular shape as first rib 511 extends laterally across first side wall 261 of reinforcing brace 106. In a similar manner, second rib 512 includes first portion 541 and second portion 542 that extend inward from fourth wall 274. First portion 541 and second portion 542 also join inward of fourth wall 274 to form a generally triangular shape as second rib 512 extends between fourth corner 284 and sixth corner 286. The remaining ribs of plurality of ribs 510 may be configured in a substantially similar manner. With this configuration, plurality of ribs 510 can provide additional strength and support to frame rail 102 and cross member 108 in a lateral, longitudinal and vertical load directions.

Generally, plurality of ribs 510 may be formed in any manner known in the art. In some embodiments, plurality of ribs 510 may be formed from a similar material as reinforcing brace 106. In other embodiments, plurality of ribs 510 may be formed from a different material than reinforcing brace 106. In some cases, plurality of ribs 510 may be integrally formed with reinforcing brace 106. In other cases, plurality of ribs 510 may be attached to reinforcing brace 106 through welding, adhesives or in another manner known in the art.

Figure 6:
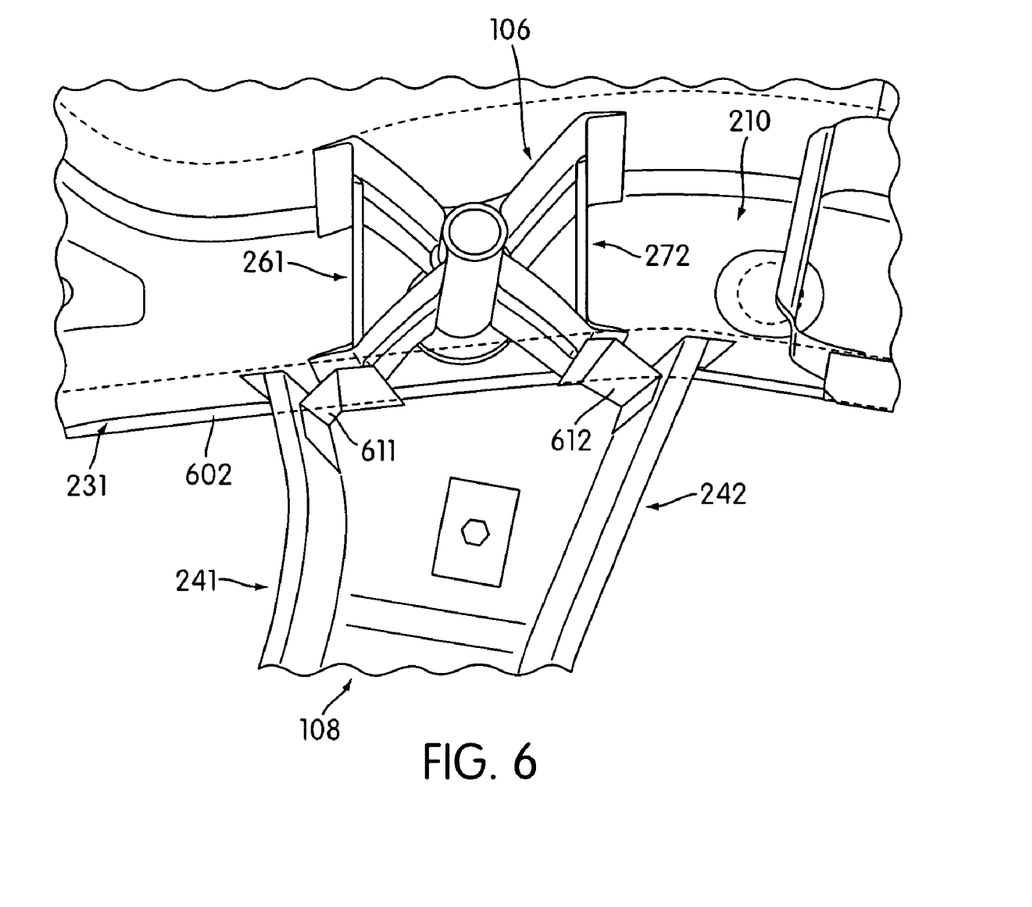
FIG. 6 is top down view of an embodiment of a frame rail, cross member and a reinforcing brace.

FIG. 6 further illustrates the configuration of reinforcing brace 106 with respect to frame rail 102 and cross member 108. For purposes of clarity, some of frame rail 102 is illustrated in phantom in FIG. 6. This allows the alignment of reinforcing brace 106 with cross member 108 to be clearly visible.

As previously discussed, reinforcing brace 106 is configured to continue the walls of cross member 108 in order to increase the strength of the connection between cross member 108 and frame rail 102. This can be accomplished by aligning first side wall 261 and second side wall 272 of reinforcing brace 106 with first wall 241 and second wall 242, respectively, of cross member 108. In particular, first side wall 261 of reinforcing brace 106 and first wall 241 of cross member 108 are aligned in an approximately parallel manner. In a similar manner, second side wall 272 and second wall 242 of cross member 108 are aligned in an approximately parallel manner.

In this embodiment, first side wall 261 and second side wall 272 are disposed slightly inwardly of first wall 241 and second wall 242, respectively. In other words, the distance between first side wall 261 and second side wall 272 is slightly smaller than the distance between first wall 241 and second wall 242. In some cases, slightly decreasing the distance between first side wall 261 and second wide wall 272 allows reinforcing brace 106 to undergo increased stresses in a longitudinal direction.

In an exemplary embodiment, first side wall 261 of reinforcing brace 106 is separated from first wall 241 of cross member 108 by first wall 231 (illustrated in phantom) of frame raid 102. Likewise, second side wall 272 of reinforcing brace 106 is separated from second wall 242 of cross member 108 by first wall 231 (illustrated in phantom) of frame rail 102.

In some embodiments, corner bulkheads may be disposed between walls of a cross member and a wall of a panel portion to strengthen the connection between the frame rail and the cross member. In one embodiment, first corner bulkhead 611 may be disposed between first wall 241 of cross member 108 and second side 602 of first wall 231. In addition, second corner bulkhead 612 may be disposed between second wall 242 of cross member 108 and second side 602 of first wall 231. First corner bulkhead 611 and second corner bulkhead 612 can increase the strength of the connection between cross member 108 and frame rail 102. This configuration allows first side wall 261 and second side wall 272 to continue the walls of cross member 108. With this configuration, reinforcing brace 106 may increase the stiffness of the attachment of frame rail 102 to cross member 108 in a lateral, longitudinal and/or vertical load direction. It will be understood that some embodiments of the present disclosure may be provided without corner bulkheads in accordance with the principles disclosed herein.

Figure 7:
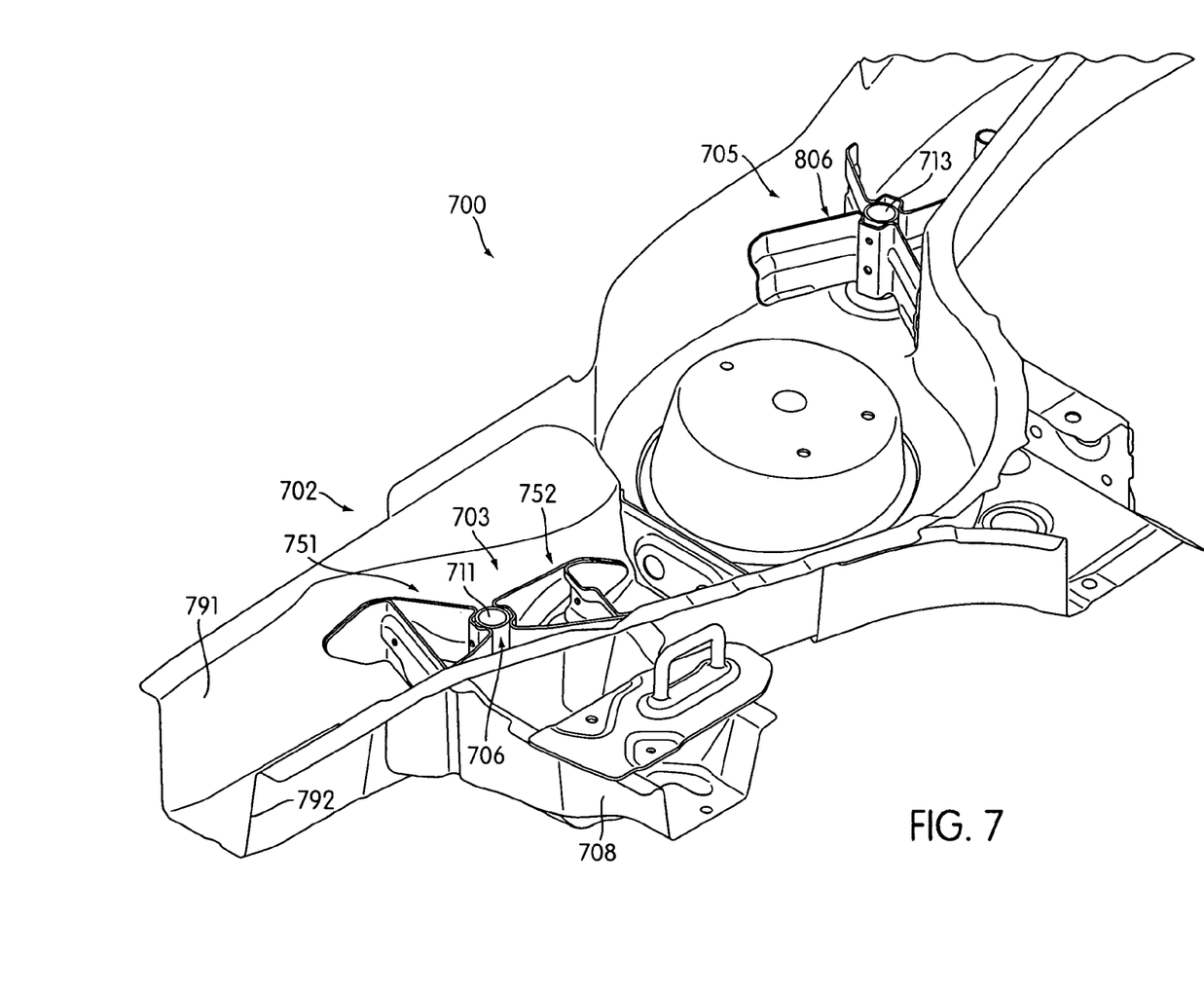
FIG. 7 is an assembled isometric view of an embodiment of a portion of a reinforcement system.
Figure 8:
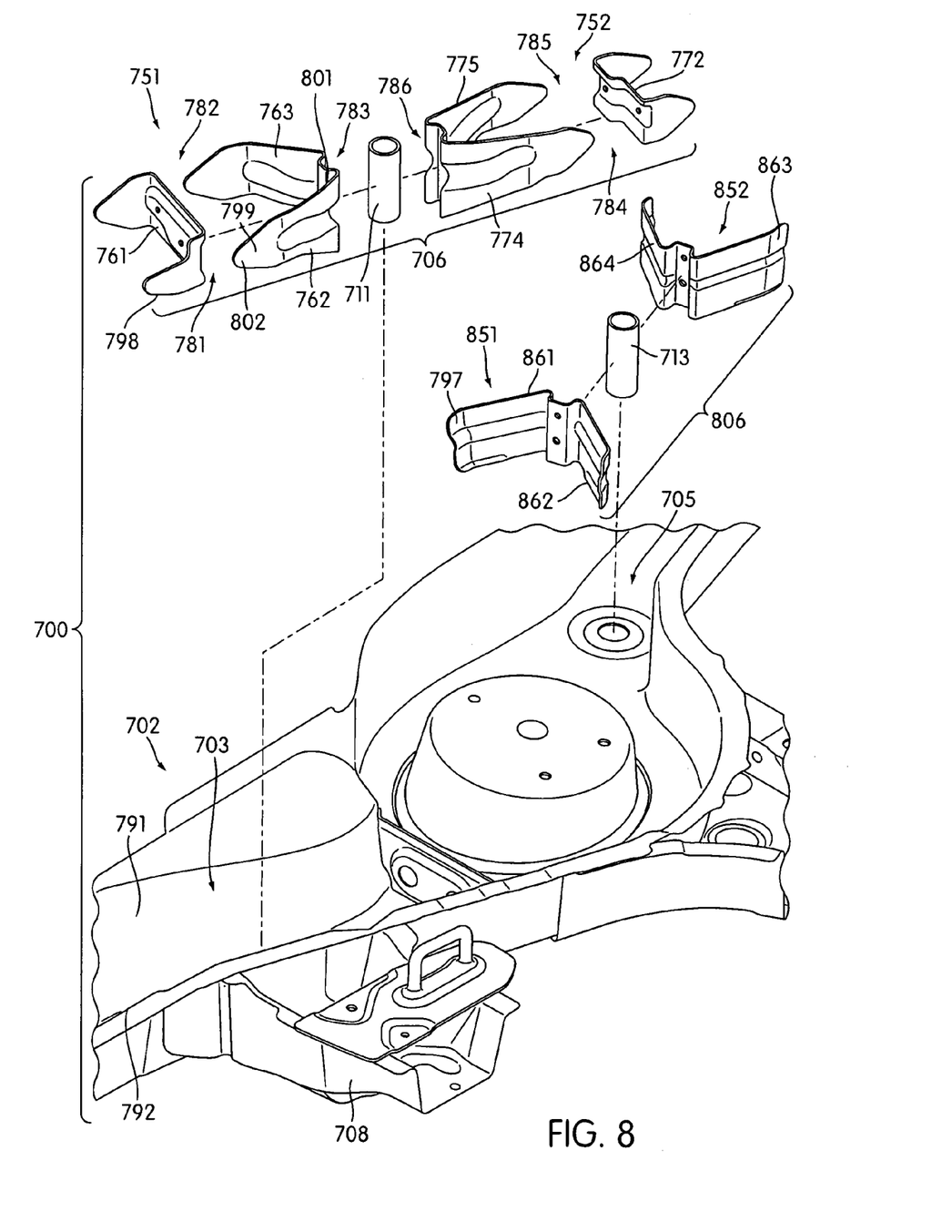
FIG. 8 is an exploded isometric view of an embodiment of a portion of a reinforcement system including a frame rail, cross member and two reinforcement braces.

FIGS. 7-10 illustrate another embodiment of a reinforcement system. In particular, FIGS. 7-10 illustrate different embodiments of a reinforcing brace for a reinforcement system. Referring to FIGS. 7 and 8, reinforcement system 700 includes frame rail 702. As previously discussed, a frame rail may be configured to provide support to another portion of a motor vehicle, including, but not limited to, an engine, a drive train or a suspension system. In one embodiment, frame rail 702 may provide support to a suspension system.

In the previous embodiment, a single region of a frame rail was discussed. In some other embodiments, a frame rail can include multiple regions that require bracing. In this embodiment, frame rail 702 includes first bracing region 703 and second bracing region 705. In some cases, first bracing region 703 may be a portion of frame rail 702 that is attached to cross member 708. In contrast, second bracing region 705 may be a portion of frame rail 702 that is not associated with a cross member. In one embodiment, first bracing region 703 may be associated with first collar 711 that is configured to attach to an engine, drive train or suspension system. Similarly, second bracing region 705 may be associated with second collar 713 that is configured to attach to an engine, drive train or suspension system. The current embodiment includes two reinforcing braces, as discussed below. It should be understood that each of these reinforcing braces is intended as optional and some embodiments may only include a single reinforcing brace.

In one embodiment, frame rail 702 includes first reinforcing brace 706. In particular, first reinforcing brace 706 is associated with first bracing region 703. In one embodiment, first reinforcing brace 706 is configured to attach to first frame rail wall 791 and second frame rail wall 792. With this arrangement, first reinforcing brace 706 may be configured to support first collar 711 in order to dampen vibrations that may be applied to first collar 711. Also, as previously discussed with respect to the previous embodiment, this arrangement can provide increased support to the connection between frame rail 702 and cross member 708.

Generally, first reinforcing brace 706 can have any shape. In some cases, first reinforcing brace 706 can have an approximately X-like shape. In other cases, first reinforcing brace 706 can have an approximately rectangular shape. In still other cases, first reinforcing brace 706 could have any other shape, including, but not limited to, circular, oval, regular polygonal, irregular, as well as any other type of shape. Furthermore, first reinforcing brace 706 could have any arrangement of exterior wall portions and interior wall portions.

In some embodiments, in order to support first collar 711, first reinforcing brace 706 may be configured with an approximately butterfly-like shape, as illustrated in the Figures. In other words, first reinforcing brace 706 comprises first side portion 751 and second side portion 752 that form an approximately butterfly-like shape. With this arrangement, first collar 711 may be disposed in the center of first reinforcing brace 706 and supported by first side portion 751 and second side portion 752 of first reinforcing brace 706.

In some embodiments, first side portion 751 and second side portion 752 may be configured with substantially triangular shapes. Referring to FIG. 8, first side portion 751 includes first side wall 761, second wall 762 and third wall 763. First side wall 761 is attached to second wall 762 at first corner 781. Also, first side wall 761 is attached to third wall 763 at second corner 782. In addition, second wall 762 and third wall 763 join at third corner 783 disposed adjacent to first collar 711. In a similar manner, second side portion 752 includes second side wall 772, fourth wall 774 and fifth wall 775. Second side wall 772 joins fourth wall 774 at fourth corner 784. Likewise, second side wall 772 joins fifth wall 775 at fifth corner 785. Finally, fourth wall 774 and fifth wall 775 join at sixth corner 786 disposed adjacent to first collar 711. With this configuration, first side portion 751 and second side portion 752 can be shaped to distribute loads in multiple directions between first collar 711 and frame rail 702.

In one embodiment, the height of first reinforcing brace 706 can vary. In some cases, second wall 762 and third wall 763 can vary in height. Referring to FIG. 8, first end portion 801 of second wall 762 has a height that is substantially similar to the height of first collar 711. Furthermore, the height of second wall 762 may taper between first end portion 801 and second end portion 802. In some cases, third wall 763, fourth wall 774 and fifth wall 775 may have substantially similar tapered heights. In some cases, this tapered wall arrangement allows first reinforcing brace 706 to be more readily adapted to the shape of first bracing region 703.

In some embodiments, first reinforcing brace 706 can include provisions for attaching second wall 762, third wall 763, fourth wall 774 and fifth wall 775 with first frame rail wall 791 and second frame rail wall 792. In one embodiment, second wall 762, third wall 763, fourth wall 774 and fifth wall 775 can include angled end portions 799. For example, in this embodiment, second end portion 802 of second wall 762 is angled with respect to a majority of second wall 762, including first end portion 801. Furthermore, the end portions of third wall 763, fourth wall 774 and fifth wall 775 can be angled in a similar manner. In some cases, angled end portions 799 are angled in a manner that is substantially parallel with first frame rail wall 791 and second frame rail wall 792 at first bracing region 703. With this arrangement, angle end portions 799 provide a substantially parallel attachment surface to be joined with first frame wall 791 and second frame rail wall 792.

In different embodiments, the sizes of angles end portions 799 can vary. In some cases, angled end portions 799 may have a length that is small compared with the length of each corresponding wall. In other cases, angled end portions 799 can have a length that is large compared with the length of each corresponding wall. In one embodiment, angled end portions 799 may have a length that is in the range between twenty percent and forty percent of the length of each corresponding wall. With this arrangement, angled end portions 799 can provide a substantially large surface area for connecting with first frame rail wall 791 and second frame rail wall 792.

In some cases, first side wall 761 and second side wall 772 can include end portions 798 that are also angled. In particular, end portions 798 may be angled in a manner that provides for overlap between end portions 798 and angled end portions 799. This arrangement may provide for a stronger connection between first reinforcing brace 706 and frame rail 702.

Referring to FIGS. 7 and 8, frame rail 702 can includes second reinforcing brace 806. In particular, second reinforcing brace 806 is associated with second bracing region 705. In some embodiments, second reinforcing brace 806 may be configured to support second collar 713 in order to dampen vibrations that may be applied to second collar 713.

Generally, second reinforcing brace 806 can have any shape. In some cases, second reinforcing brace 806 can have an approximately X-like shape. In other cases, second reinforcing brace 806 can have an approximately rectangular shape. In still other cases, second reinforcing brace 806 could have any other shape, including, but not limited to, circular, oval, regular polygonal, irregular, as well as any other type of shape. Furthermore, second reinforcing brace 806 could have any arrangement of exterior wall portions and interior wall portions.

In some embodiments, second reinforcing brace can be configured without side wall portions. In other words, second reinforcing brace 806 may include first side portion 851 and second side portion 852, as seen in FIG. 8. First side portion 851 may further include first wall 861 and second wall 862. Likewise, second side portion 852 may further include third wall 863 and fourth wall 864. However, the current embodiment does not include side wall portions that extend between the ends of first wall 861 and second wall 862 or third wall 863 and fourth wall 864. It should be understood, that other embodiments of second reinforcing brace 806 can include side wall portions.

In one embodiment, the walls of second reinforcing brace 806 may have a substantially uniform height. In particular, the height of first wall 861, second wall 862, third wall 863 and fourth wall 864 may be substantially similar to the height of second collar 713 in order to provide increased support to second collar 713. In other embodiments, however, one or more walls of second reinforcing brace may have tapered heights.

In some embodiments, second reinforcing brace 806 can include provisions for attaching first wall 861, second wall 862, third wall 863 and fourth wall 864 to first frame rail wall 791 and second frame rail wall 792. In one embodiment, first wall 861, second wall 862, third wall 863 and fourth wall 864 can include angled portions 797. In some cases, angled end portions 797 are angled in a manner that is substantially parallel with first frame rail wall 791 and second frame rail wall 792 at second bracing region 705. With this arrangement, angle end portions 797 provide a substantially parallel attachment surface for joining to frame wall 791 and second frame rail wall 792.

In different embodiments, the sizes of angles end portions 797 can vary. In some cases, angled end portions 797 may have a length that is small compared with the length of each corresponding wall. In other cases, angled end portions 797 can have a length that is large compared with the length of each corresponding wall. In one embodiment, angled end portions 797 may have a length that is in the range between one percent and thirty percent of the length of each corresponding wall.

In some embodiments, one or more portions of a reinforcing brace can include openings for various manufacturing purposes. In some cases, a reinforcing brace can include an opening for receiving a holding device or tool. In other cases, a reinforcing brace can include an opening for facilitating positioning of one or more walls of the reinforcing brace. For example, in some cases, one or more walls of a reinforcing brace can include holes for receiving a manufacturing tool.

In some embodiments, a reinforcing brace may include provisions to further support the connection between a frame rail and a cross member. For example, in some cases, the walls of a reinforcing brace may have a corrugated structure. In other cases, a reinforcing brace may be configured with internal supports that extend between walls of the reinforcing brace. In still other cases, a reinforcing brace may be configured with ribs to provide additional support to a frame rail and a cross member.

Figure 9:
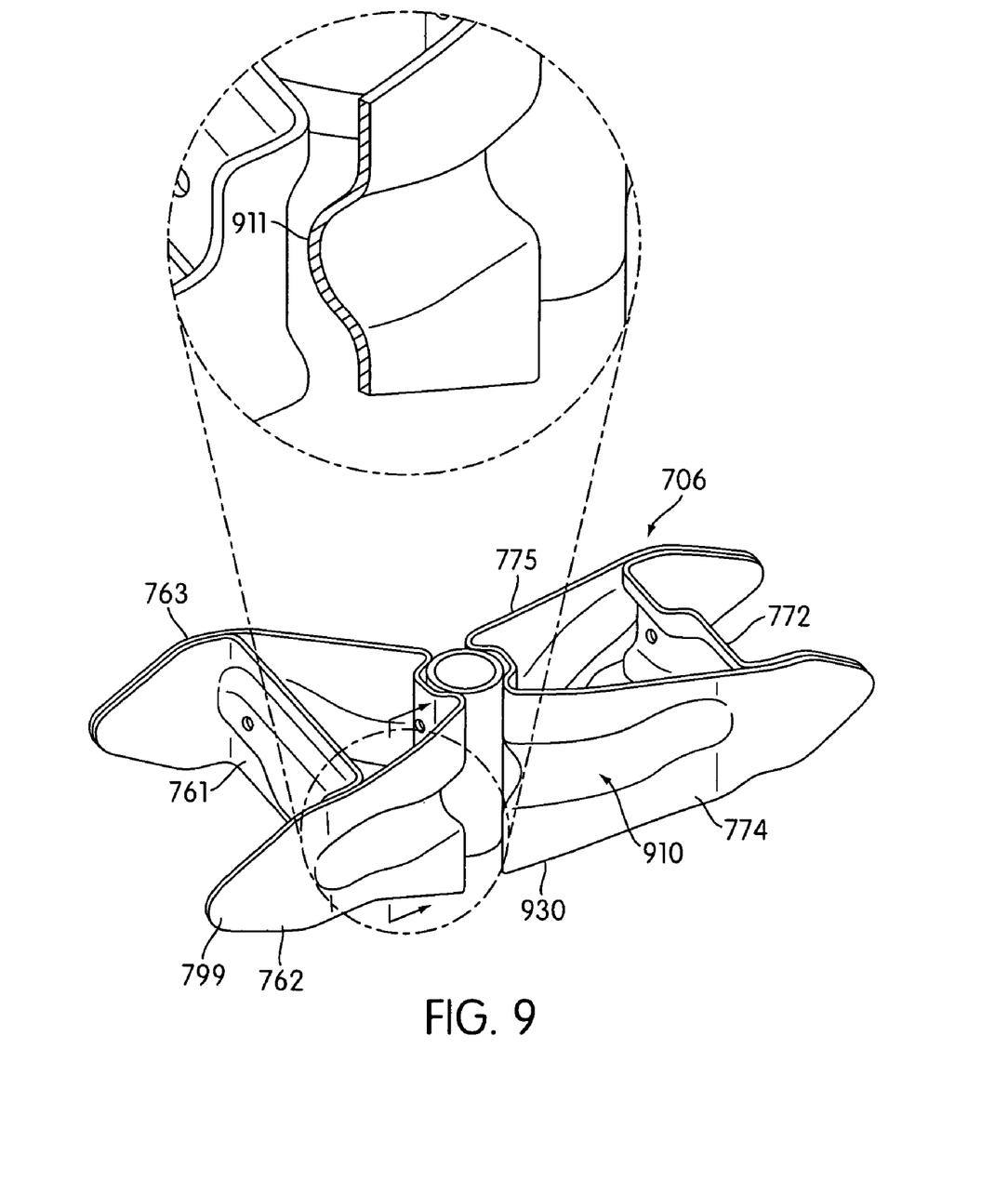
FIG. 9 is an isometric view of an embodiment of a first reinforcing brace.

Referring to FIG. 9, first reinforcing brace 706 is configured with first plurality of ribs 910 to provide additional support for a frame rail. In particular, each rib of first plurality of ribs 910 is associated with a wall of first reinforcing brace 706.

Generally, first plurality of ribs 910 may extend in any direction, including a lateral direction, longitudinal direction, vertical direction or any combination of directions. In one embodiment, each rib of first plurality of ribs 910 extends in a substantially similar direction as an associated wall of first reinforcing brace 706. For example, first rib 911, disposed on first wall 762, extends in a combination of the lateral and the longitudinal direction. In a similar manner, the remaining ribs of plurality of ribs 910 may extend in a substantially similar direction as the associated walls of first reinforcing brace 706. With this arrangement, plurality of ribs 910 provides additional strength and support to a frame rail.

In some cases, a rib may extend over the entire length of a wall of a reinforcing brace. In other cases, a rib may only extend over a portion of the length of a wall. For example, in this exemplary embodiment, first plurality of ribs 910 extend only over a portion of second wall 762, third wall 763, fourth wall 774 and fifth wall 775. In particular, first plurality of ribs 910 do not extend through angled end portions 799. In some embodiments, ribs may not be provided on angled end portions 799 in order to maximize the attachment area between first reinforcing brace 706 and the frame rail.

Ribs of first plurality of ribs 910 may be configured with any shape including, but not limited to, regular shapes, irregular shapes, convex shapes, concave shapes as well as other shapes. In some embodiments, ribs of first plurality of ribs 910 are configured with substantially similar shapes. In one embodiment, first plurality of ribs 910 is configured with generally rounded shapes. As illustrated in the enlarged view in FIG. 9, first rib 911 has a substantially rounded shape. This arrangement provides increased cross-sectional strength for first reinforcing brace 706.

In this exemplary embodiment, first plurality of ribs 910 are concave with respect to first outwards facing portion 930 of first reinforcing brace 706. In some cases, this concave arrangement allows one or more ribs from first plurality of ribs 910 to engage and receive corresponding ribs on walls of a frame portion. This arrangement can increase the strength of the connection between first reinforcing brace 706 and the frame portion. In other embodiments, however, first plurality of ribs 910 may be convex ribs that project outwards from first outwards facing portion 930. In still other embodiments, first plurality of ribs 910 can include a combination of convex and concave ribs.

Figure 10:
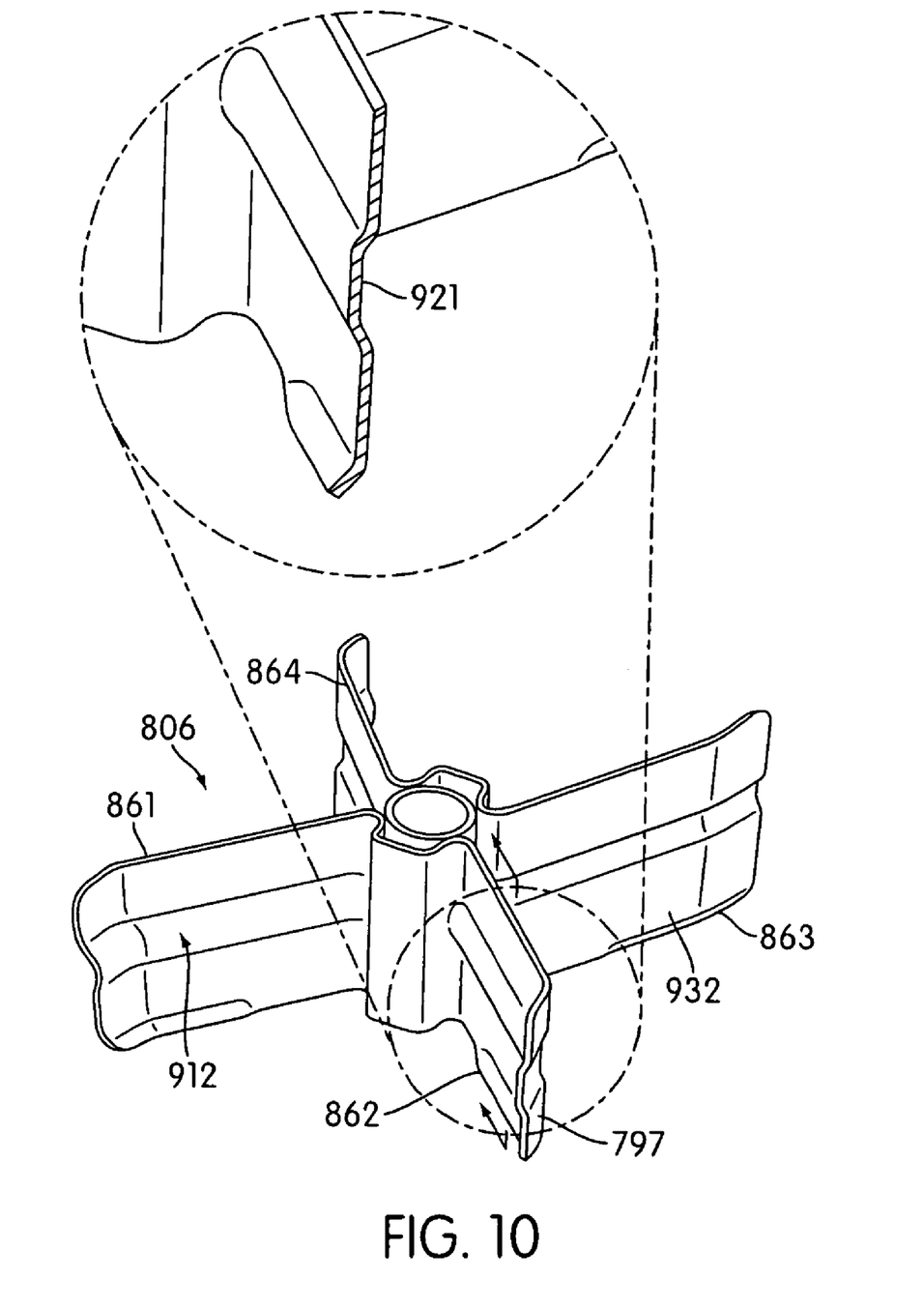
FIG. 10 is an isometric view of an embodiment of a second reinforcing brace.

Referring to FIG. 10, second reinforcing brace 806 may be configured with second plurality of ribs 912 to provide additional support for a frame rail. In particular, each rib of second plurality of ribs 912 is associated with a wall of second reinforcing brace 806. In some cases, the shape of second plurality of ribs 912 may have a generally rounded shape. For example, first rib 921 of second plurality of ribs 912 is seen to have a substantially rounded shape, as seen in FIG. 10. In other cases, each rib of second plurality of ribs 12 can be made of a set of planar surfaces. Furthermore, second plurality of ribs 912 may extend throughout the entirety of first wall 861, second wall 862, third wall 863 and fourth wall 864. In particular, second plurality of ribs 912 may extend through angled end portions 797.

In this exemplary embodiment, second plurality of ribs 912 are concave with respect to second outwards facing portion 932 of second reinforcing brace 806. In some cases, this concave arrangement allows one or more ribs from second plurality of ribs 912 to engage and receive corresponding ribs on walls of a frame portion. This arrangement can increase the strength of the connection between second reinforcing brace 806 and the frame portion. In other embodiments, however, second plurality of ribs 912 may be convex ribs that project outwards from second outwards facing portion 932. In still other embodiments, second plurality of ribs 912 can include a combination of convex and concave ribs.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A reinforcement system for a body frame rail, comprising:
    a frame rail;
    a collar in contact with the frame rail and extending in a substantially perpendicular direction to the frame rail;
    a cross member configured to attach to the frame rail in a substantially perpendicular manner;
    the cross member including a first wall and a second wall configured to attach to the frame rail;
    a reinforcing brace configured to attach to the collar, the reinforcing brace including a first side wall that extends laterally across the frame rail and the reinforcing brace including a second side wall that extends laterally across the frame rail; and
    wherein the first side wall of the reinforcing brace is aligned in a manner that substantially continues the first wall of the cross member and wherein the second side wall of the reinforcing brace is aligned in a manner that substantially continues the second wall of the cross member.

2. The reinforcement system according to claim 1, wherein the height of the first side wall of the reinforcing brace is approximately equal to the height of the first wall of the cross member.

3. The reinforcement system according to claim 1, wherein the height of the second side wall of the reinforcing brace is approximately equal to the height of the second wall of the cross member.

4. The reinforcement system according to claim 1, wherein the collar is configured to receive a bolt.

5. The reinforcement system according to claim 1, wherein the reinforcing brace includes a first side portion having a triangular shape.

6. The reinforcement system according to claim 5, wherein the reinforcing brace includes a second side portion having a triangular shape.

7. The reinforcement system according to claim 5, wherein the first side portion is welded to the collar.

8. The reinforcement system according to claim 6, wherein the second side portion is welded to the collar.

9. The reinforcement system according to claim 5, wherein the first side portion and the collar have substantially similar heights.

10. The reinforcement system according to claim 6, wherein the second side portion and the collar have substantially similar heights.

11. The reinforcement system according to claim 1, wherein the reinforcing brace includes a plurality of walls that extend radially outwards from the collar.

12. The reinforcement system according to claim 1, wherein the reinforcing brace includes a first wall that extends between the collar and the first side wall and wherein the reinforcing brace includes a second wall that extends between the collar and the first side wall.

13. The reinforcement system according to claim 12, wherein the reinforcing brace includes a third wall that extends between the collar and the second side wall and wherein the reinforcing brace includes a fourth wall that extends between the collar and the second side wall.

14. The reinforcement system according to claim 13, wherein the first wall, the second wall, the third wall and the fourth wall are configured in an approximately X-like shape.

15. The reinforcement system according to claim 1, wherein the first side wall of the reinforcing brace is oriented in a substantially parallel manner with the first wall of the cross member and wherein the second side wall of the reinforcing brace is oriented in a substantially parallel manner with the second wall of the cross member.

* * * * *